United States Patent
Lee et al.

(10) Patent No.: US 7,982,735 B2
(45) Date of Patent: Jul. 19, 2011

(54) METHOD, APPARATUS, AND MEDIUM FOR THREE-DIMENSIONALLY TRANSFORMING AND VISUALIZING TWO-DIMENSIONAL FLYOVER DATA IN THREE-DIMENSIONAL GRAPHICS ENVIRONMENT

(75) Inventors: Keechang Lee, Yongin-si (KR); Dokyoon Kim, Seongnam-si (KR); Jeonghwan Ahn, Suwon-si (KR); Shinjun Lee, Seoul (KR); Heesae Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 210 days.

(21) Appl. No.: 11/226,201

(22) Filed: Sep. 15, 2005

(65) Prior Publication Data

US 2006/0164416 A1 Jul. 27, 2006

(30) Foreign Application Priority Data

Jan. 25, 2005 (KR) .................. 10-2005-0006574

(51) Int. Cl.
*G06T 15/00* (2006.01)

(52) U.S. Cl. ........ 345/427; 345/423; 345/582; 345/630; 701/208

(58) Field of Classification Search .................. 345/427, 345/419, 423, 582, 629, 630; 701/228
See application file for complete search history.

(56) References Cited

U.S. PATENT DOCUMENTS

| | | | | |
|---|---|---|---|---|
| 5,361,333 A | * | 11/1994 | Ahlquist et al. | 345/442 |
| 5,522,018 A | * | 5/1996 | Takeda et al. | 345/422 |
| 6,169,552 B1 | * | 1/2001 | Endo et al. | 345/427 |
| 6,384,834 B1 | * | 5/2002 | Watanabe | 345/582 |
| 6,424,911 B2 | * | 7/2002 | Yamashita et al. | 701/208 |
| 6,593,926 B1 | * | 7/2003 | Yamaguchi et al. | 345/427 |
| 6,622,085 B1 | * | 9/2003 | Amita et al. | 701/208 |
| 6,788,310 B1 | * | 9/2004 | Politis | 345/630 |
| 6,867,787 B1 | * | 3/2005 | Shimizu et al. | 345/629 |
| 6,917,877 B2 | * | 7/2005 | Yang | 701/208 |
| 7,023,432 B2 | * | 4/2006 | Fletcher et al. | 345/419 |
| 7,133,044 B2 | * | 11/2006 | Maillot et al. | 345/423 |
| 7,321,373 B2 | * | 1/2008 | Yap | 345/629 |

FOREIGN PATENT DOCUMENTS

EP 1 182 611 2/2002

OTHER PUBLICATIONS

David Eberly, "Triangulation by Ear Clipping," Sep. 4, 2003, p. 1-6, [online], [retrieved on Aug. 15, 2007]. Retrieved from the Internet <URL: http://sktm.ums.edu.my/~azali/compgeo/TriangulationByEarClipping.pdf>.*

(Continued)

*Primary Examiner* — Phu Nguyen
(74) *Attorney, Agent, or Firm* — Staas & Halsey LLP

(57) ABSTRACT

An apparatus for three-dimensionally visualizing two-dimensional flyover data in a three-dimensional graphics environment includes an overlapped region separation unit, a triangulation unit, a height coordinate addition unit, and a visualization unit. The division lines are selectively applied to a polygon to separate overlapped regions from the polygon, an ear cutting algorithm is applied to triangulate the polygon, and various different visualization processes are performed on different portions of the flyover data.

32 Claims, 15 Drawing Sheets

OTHER PUBLICATIONS

M.J. Kilgard, "Improving Shadows and Reflections via the Stencil Buffer," Nov. 3, 1999, NVIDIA White Paper, [online], [retrieved on Aug. 15, 2007]. Retrieved from the Internet <URL: http://developer.nvidia.com/object/Stencil_Buffer_Tutorial.html>.*

Lamot et al., "A fast polygon triangulation algorithm based on uniform plane subdivision" Computers & Graphics 27 (2003) pp. 239-253.

European Search Report issued May 15, 2006 in European Patent Application No. 06250338.8-2218.

* cited by examiner

METHOD, APPARATUS, AND MEDIUM FOR THREE-DIMENSIONALLY TRANSFORMING AND VISUALIZING TWO-DIMENSIONAL FLYOVER DATA IN THREE-DIMENSIONAL GRAPHICS ENVIRONMENT

CROSS-REFERENCE TO RELATED APPLICATIONS

This application claims the benefit of Korean Patent Application No. 10-2005-0006574, filed on Jan. 25, 2005, in the Korean Intellectual Property Office, the disclosure of which is incorporated herein in its entirety by reference.

BACKGROUND OF THE INVENTION

1. Field of the Invention

The present invention relates to car navigation, and more particularly, to a method, apparatus, and medium for three-dimensionally transforming two-dimensional flyover data in a three-dimensional graphics environment and a method, apparatus, and medium for three-dimensionally visualizing two-dimensional flyover data in a three-dimensional graphics environment.

2. Description of the Related Art

Recently, an increase in the number of cars on roads has caused a serious problem of traffic congestion. In order to solve the traffic congestion, there have been developed car navigation systems such as a global positioning system (GPS). The car navigation system has basic functions of tracking a position of a car and displaying the position on a road map. The car navigation system has additional functions of monitoring traffic situations on roads and providing traffic situation information to drivers.

A well-visualized car navigation system enables drivers to accurately locate their destination on the road map. In addition, when a car runs at a high speed, a three-dimensionally visualized road map of the car navigation system provides more convenience and safety to a driver than a two-dimensional map does. Buildings and geographical features are depicted three-dimensionally on the three-dimensionally visualized road map, so that drivers can perceive them intuitively.

Conventional car navigation systems store two-dimensional data and visualize the data two-dimensionally. Since complex objects such as flyovers are two-dimensionally visualized, the users may confuse the objects.

FIGS. 1A and 1B are views showing three-dimensionally visualized flyover data according to a conventional method. Referring to FIG. 1A, two different parts of a flyover having different heights are overlapped at a portion indicated by 1. If a flyover is two-dimensionally visualized, the other parts of a flyover seem to intersect each other on the same plane. Therefore, inaccurate road information may be provided to users. In addition, as shown in FIG. 1B, flyover data may be displayed according to an order of arrangement of vertexes of a polygon constituting the flyover data.

In a three-dimensional graphics environment, in a case where different parts of an object do not exist on the same plane (a non-coplanar case) or a case where projections of the different parts of an object on the same plane intersect each other (a self-intersection case), visualization of an object may not be accurate. Since the flyover data belongs to the two cases, it is necessary to transform the two-dimensional flyover data to three-dimensional flyover data with a particular process.

SUMMARY OF THE INVENTION

Additional aspects, features, and/or advantages of the invention will be set forth in part in the description which follows and, in part, will be apparent from the description, or may be learned by practice of the invention.

The present invention provides a method and apparatus for three-dimensionally transforming two-dimensional flyover data in a three-dimensional graphics environment and a computer-readable medium having embodied thereon a computer program for the method.

The present invention also provides a method and apparatus for three-dimensionally visualizing two-dimensional flyover data in a three-dimensional graphics environment and a computer-readable medium having embodied thereon a computer program for the method.

According to an aspect of the present invention, there is provided a method of three-dimensionally transforming two-dimensional flyover data in a three-dimensional graphics environment, comprising: generating a division line list including one or more division lines of dividing a polygon constituting the two-dimensional flyover data into two regions; selecting a division line for reducing the number of overlapped regions of the polygon among the division lines included in the division line list; and separating the divided regions from the polygon by applying the selected division line to the polygon.

According to another aspect of the present invention, there is provided an apparatus for three-dimensionally transforming two-dimensional flyover data in a three-dimensional graphics environment, comprising: a division line list generation unit generating a division line list including one or more division lines of dividing a polygon constituting the two-dimensional flyover data into two regions; a division line selection unit selecting a division line for reducing the number of overlapped regions of the polygon among the division lines included in the division line list; and a division line applying unit separating the divided regions from the polygon by applying the selected division line to the polygon.

According to still another aspect of the present invention, there is provided a method of three-dimensionally visualizing two-dimensional flyover data in a three-dimensional graphics environment, comprising: separating divided regions of the polygon constituting the two-dimensional flyover data; dividing each of the separated regions of the polygon into one or more triangles; generating three-dimensional flyover data by adding height coordinates to the respective vertexes of the divided triangles; and visualizing the three-dimensional flyover data.

According to yet another aspect of the present invention, there is provided an apparatus for three-dimensionally visualizing two-dimensional flyover data in a three-dimensional graphics environment, comprising: an overlapped region separation unit separating overlapped regions of the polygon constituting the two-dimensional flyover data; a triangulation unit dividing each of the separated regions of the polygon into one or more triangles; a height coordinate addition unit generating three-dimensional flyover data by adding height coordinates to the respective vertexes of the divided triangles; and a visualization unit visualizing the three-dimensional flyover data.

According to an aspect of the present invention, there is provided a method of three-dimensionally transforming two-dimensional flyover data in a three- dimensional graphics environment, comprising: selecting a division line for reducing a number of overlapped regions of a polygon among a plurality of division lines, which divide a polygon comprising the two dimensional flyover data into regions; and separating the divided regions from the polygon by applying the selected division line to the polygon.

According to an aspect of the present invention, there is provided at least one computer-readable medium storing instructions that control at least one processor to perform a method of three-dimensionally transforming two-dimensional flyover data in a three-dimensional graphics environment, wherein the method comprises: selecting a division line for reducing a number of overlapped regions of a polygon among a plurality of division lines, which divide a polygon comprising the two dimensional flyover data into regions; and separating the divided regions from the polygon by applying the selected division line to the polygon.

BRIEF DESCRIPTION OF THE DRAWINGS

These and/or other aspects, features, and advantages of the present invention will become apparent and more readily appreciated from the following description of the exemplary embodiments, with reference to the accompanying drawings of which.

DETAILED DESCRIPTION OF THE PREFERRED EMBODIMENTS

Figure 1A:
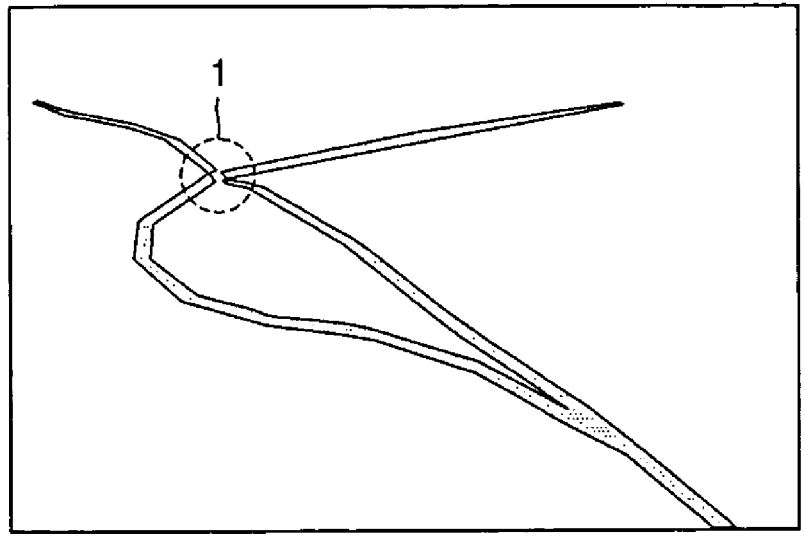
FIGS. 1A and 1B are views showing three-dimensionally visualized flyover data according to a conventional method.
Figure 1B:
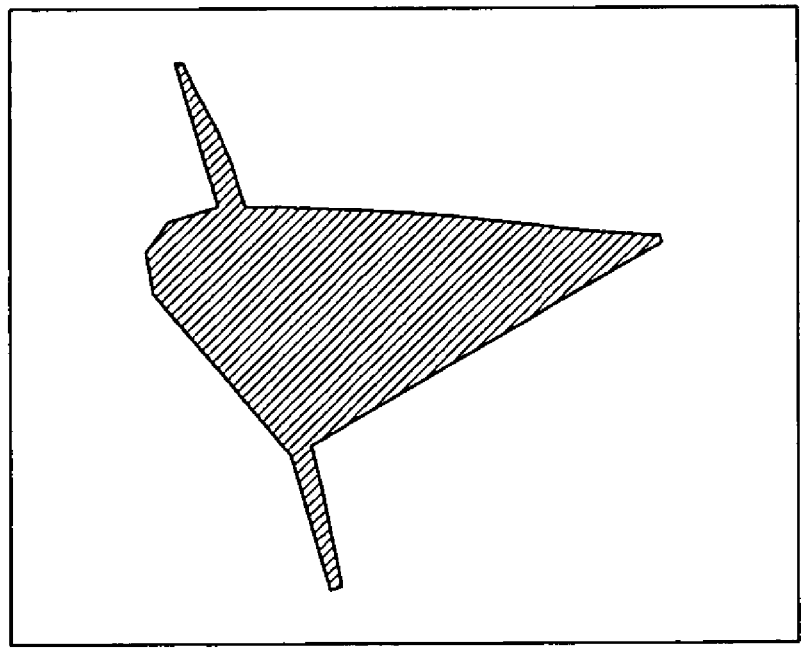

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Exemplary embodiments include a method, apparatus, and medium for three-dimensionally transforming two-dimensional flyover data in a three-dimensional graphics environment and a method, apparatus, and medium for three-dimensionally visualizing two-dimensional flyover data in a three-dimensional graphics environment.

Figure 2:
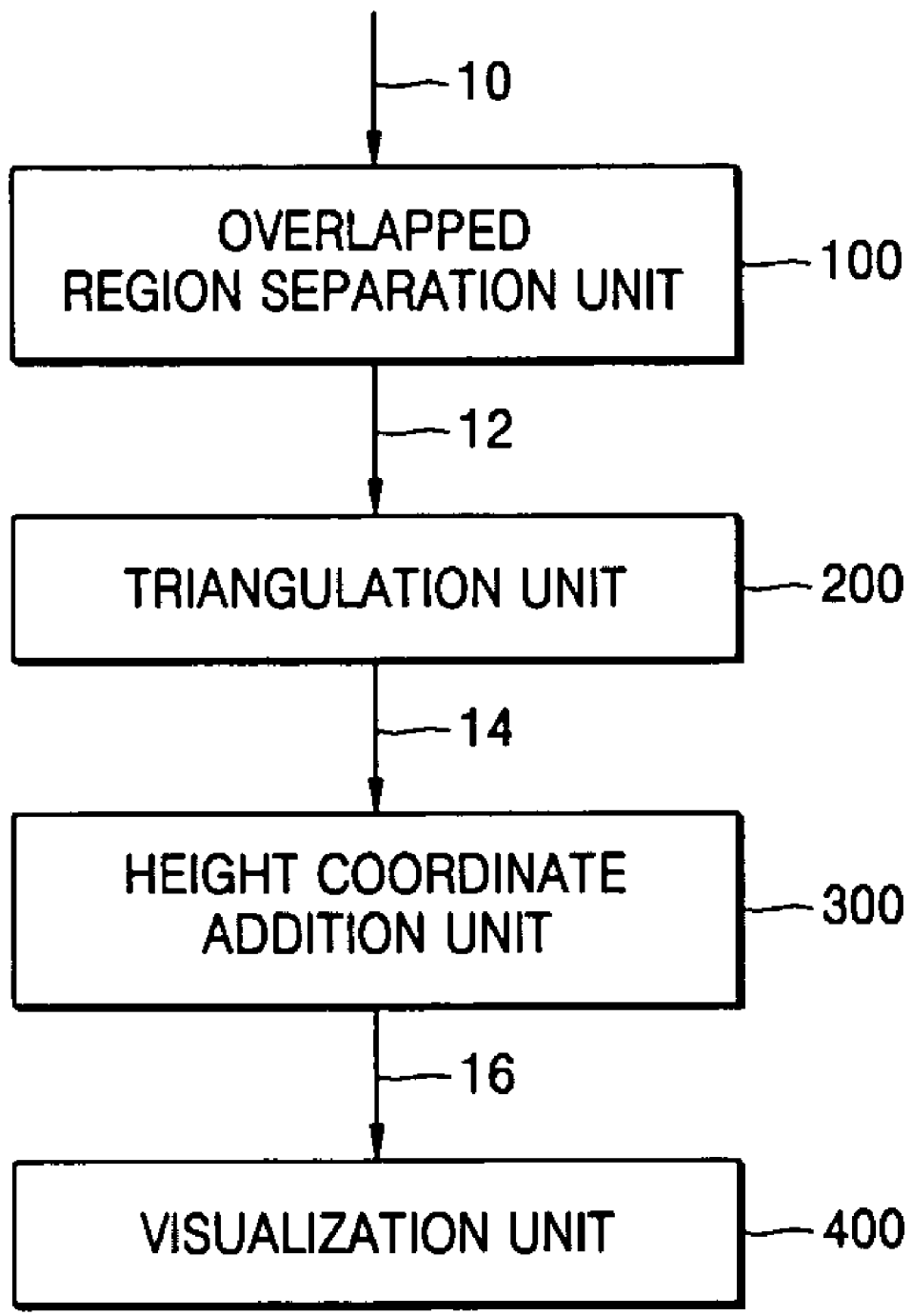
FIG. 2 is a block diagram showing a construction of an exemplary embodiment of a two-dimensional-flyover-data three-dimensional visualization apparatus according to the present invention.

FIG. 2 is a block diagram showing a construction of an exemplary embodiment of a two-dimensional-flyover-data three-dimensional visualization apparatus according to the present invention. The two-dimensional-flyover-data three-dimensional visualization apparatus includes an overlapped region separation unit 100, a triangulation unit 200, a height coordinate addition unit 300, and a visualization unit 400.

The overlapped region separation unit 100 separates overlapped regions of a polygon constituting the two-dimensional flyover data 10.

The triangulation unit 200 divides each of the separated regions 12 of the polygon into one or more triangles 14.

The height coordinate addition unit 300 adds height coordinates to vertexes of the triangles 14 to generate three-dimensional flyover data 16.

The visualization unit 400 visualizes the three-dimensional flyover data 16.

Figure 3:
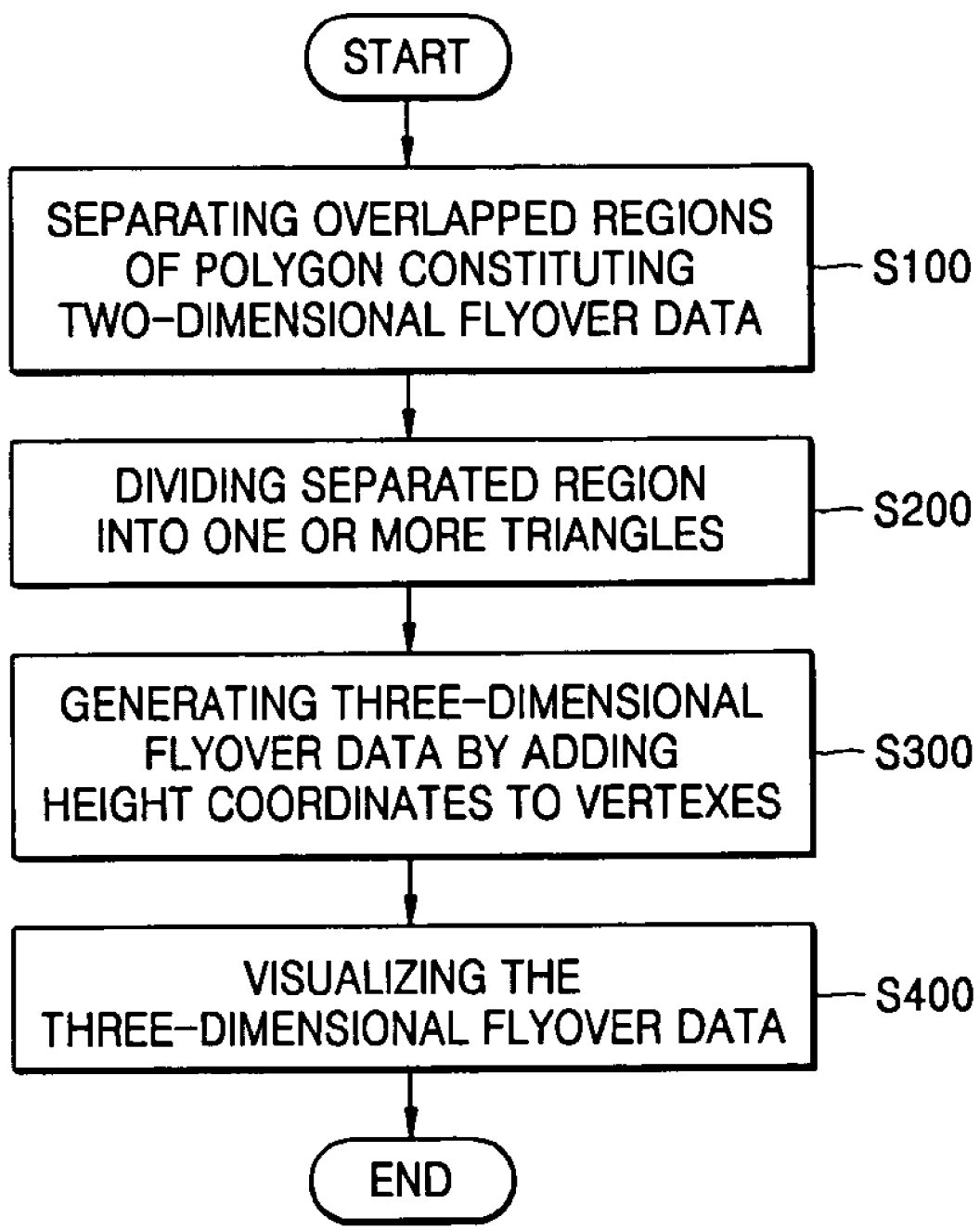
FIG. 3 is a flowchart of a two-dimensional-flyover-data three-dimensional visualization method performed by the visualization apparatus of FIG. 2 according to an exemplary embodiment of the present invention.

FIG. 3 is a flowchart of a two-dimensional-flyover-data three-dimensional visualization method performed by the visualization apparatus of FIG. 2 according to an exemplary embodiment of the present invention.

Firstly, the overlapped regions of the polygon constituting the two-dimensional flyover data 10 are separated (S100). The overlapped regions of the polygon, that is, intersections cause problems in three-dimensional visualization of the two-dimensional flyover data 10. Therefore, in order to three-dimensionally visualize the two-dimensional flyover data 10 accurately, the overlapped regions of the polygon need to be separated.

After the overlapped regions of the polygon are separated, each of the separated regions is divided into one or more triangles 14 (S200). In general, the data format that can be most easily handled in a graphic system is a triangle. Therefore, the complex polygon is divided into triangles. The triangulation unit 200 according to an exemplary embodiment of the present invention uses an ear cutting algorithm.

After each of the separated regions is divided into one or more triangles 14, height coordinates are added to the respective vertexes of the divided triangles 14 (S300). As a result, the three-dimensional flyover data 16 is generated.

The generated three-dimensional flyover data 16 is three-dimensionally visualized by the visualization unit 400 (S400).

Figure 4:
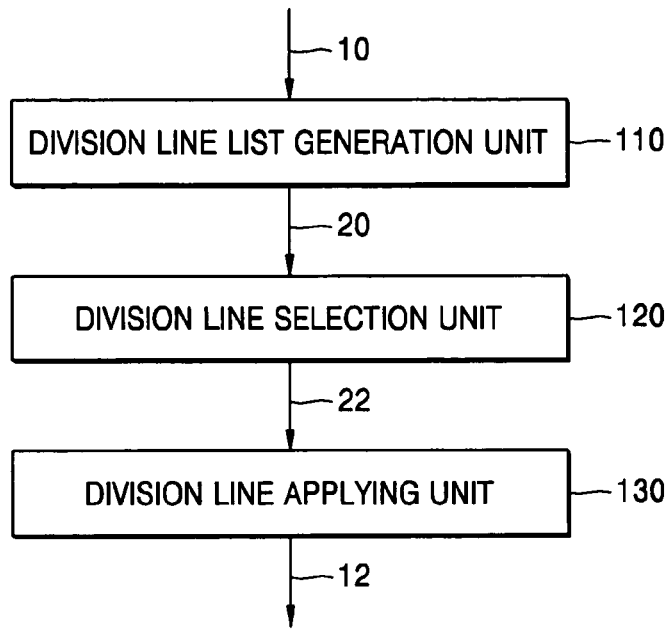
FIG. 4 is a block diagram showing an exemplary embodiment of the overlapped region separation unit according to the present invention.

FIG. 4 is a block diagram showing an exemplary embodiment of the overlapped region separation unit 100 of FIG. 2. The overlapped region separation unit 100 according to an exemplary embodiment of the present invention includes a division line list generation unit 110, a division line selection unit 120, and a division line applying unit 130.

The division line list generation unit 110 generates a division line list 20. The division line list 20 denotes a list including one or more division lines. The division line denotes a line dividing a polygon constituting the two-dimensional flyover data 10 into two or more regions.

The division line selection unit 120 selects a division line 22 among the division lines included in the division line list 20, so that the number of intersections, that is, the number of overlapped regions of the polygon can be reduced when the division line is applied to the polygon.

The division line applying unit 130 applies the division line 22 selected by the division line selection unit 120 to the polygon.

Figure 5:
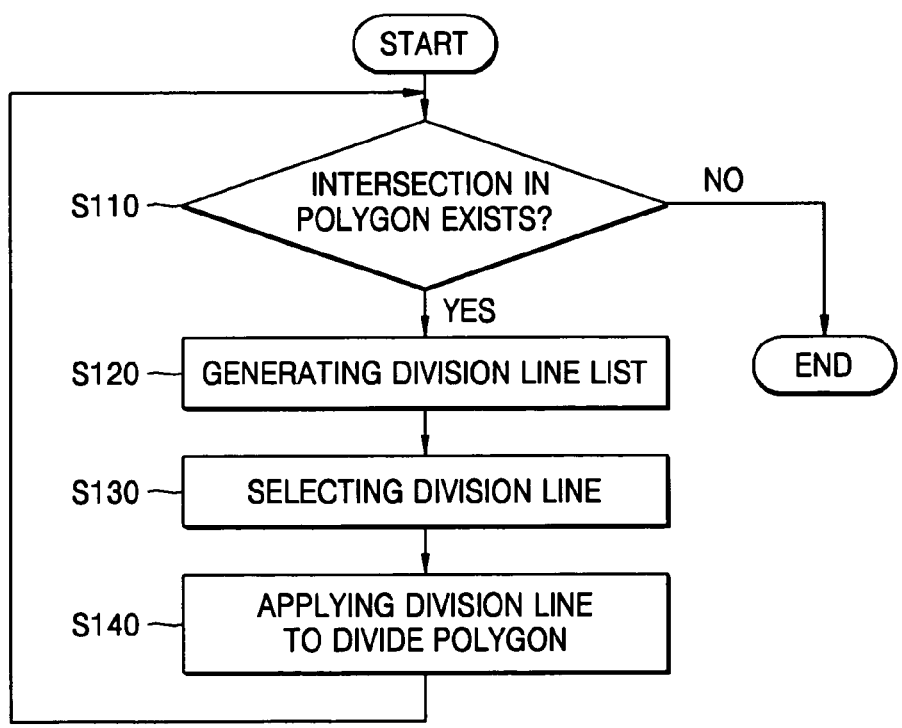
FIG. 5 is a flowchart of an exemplary embodiment of an operation of separating the overlapped regions of the polygon according to the present invention.

FIG. 5 is a flowchart of an exemplary embodiment of an operation S100 of separating the overlapped regions of the polygon shown in FIG. 3. The operation of separating the overlapped regions includes an operation of generating the division line list 20 (S120), an operation of selecting the division line 22 (S130), and an operation of repeatedly applying the division line to the polygon until there is no intersection in the polygon (S140). It is determined whether or not there is an intersection in the to-be-divided polygon (S110). If there is an intersection, the operations S120 to S140 repeat. If not, the operation S100 ends.

As described above, the division line denotes a line dividing the polygon into one or more regions. The division line satisfies three conditions: a first condition that the division line connects two vertexes among vertexes constituting the polygon; a second condition that the division line does not intersect side lines constituting the polygon; and a third condition that the division line exists within the polygon. Firstly, in order to search the division line, two vertexes are selected among the vertexes constituting the polygon. Next, it is determined whether or not a line connecting the two selected vertexes intersects the side lines constituting the polygon. Next, it is determined whether or not the line exists within the polygon. If the line satisfies the three conditions, the line is treated as a division line. After the division line is searched, the division line is added to the division line list 20.

The determination whether or not the two lines intersect each other may be performed by using the vector product. FIGS. 6A to 6C and FIGS. 7A to 7C are views for explaining the vector product used to perform the determination whether or not the two lines intersect each other.

Figure 6A:
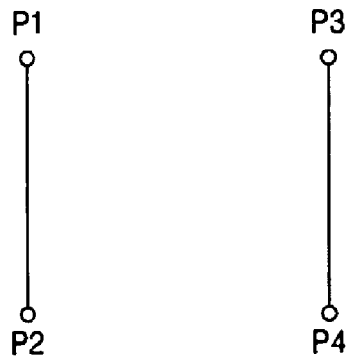
FIGS. 6A to 6C are views for explaining a vector product used to determine whether or not the two lines intersect each other in a case where the two lines do not intersect each other.
Figure 6B:
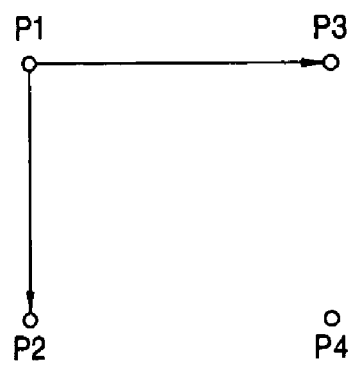
Figure 6C:
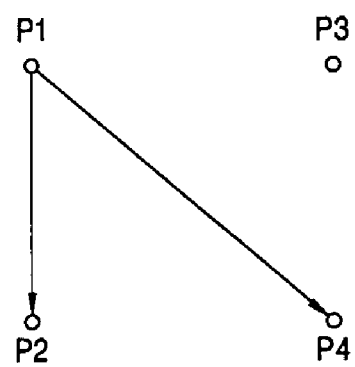

FIGS. 6A to 6C are views for explaining the vector product used to perform the determination in a case where the two lines do not intersect each other. In FIG. 6A, two points P1 and P2 constitute the one line, and two points P3 and P4 constitute the other line. As shown in FIG. 6A, the two lines do not intersect each other. Let's find out how to get the result using the vector product. A vector v1 corresponding to the one line is set to have a starting point P1 and an ending point P2. A vector v2 corresponding to the other line is set to have a starting point P1 and an ending point P3 (FIG. 6B). Next, the first vector product of the two vectors v1 and v2 is calculated. Next, a vector v3 is set to have a starting point P1 and an ending point P4 (FIG. 6C). Next, the second vector product of the vectors v1 and v3 is calculated. If the first and second vector products have the same sign, the points P3 and P4 are located at the same side portion with respect to the vector v1. Therefore, the two lines do not intersect each other.

Figure 7A:
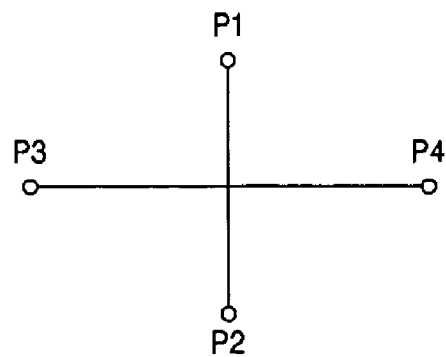
FIGS. 7A to 7C are views for explaining a vector product used to determine whether or not the two lines intersect each other in a case where the two lines intersect each other.
Figure 7B:
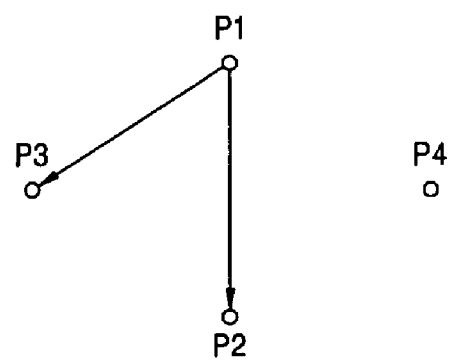
Figure 7C:
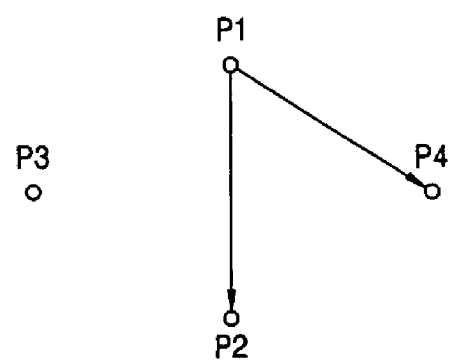

FIGS. 7A to 7C are views for explaining the vector product used to perform the determination in a case where the two lines intersect each other. The aforementioned vector product calculation is performed to obtain the first and second vector products. Unlike the case shown in FIGS. 6A to 6C, since the points P3 and P4 are located at the opposite side portions with respected to the vector v1, the first and second vector products have the opposite signs.

Like this, vectors are generated from the vertexes constituting the given lines, and then, the results of the vector products of the generated vectors are calculated, so that it can be.

Figure 8:
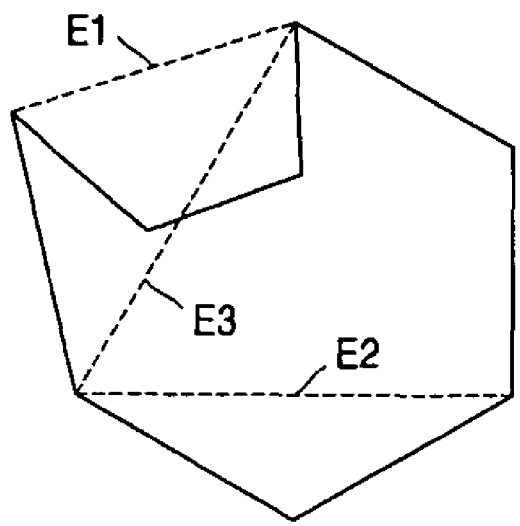
FIG. 8 is a view showing division lines and non-division lines which connecting vertexes constituting an arbitrary polygon.

FIG. 8 is a view showing division lines and non-division lines which connecting vertexes constituting an arbitrary polygon. A line E1 which exists outside the polygon is not a division line. The line E1 cannot divide the polygon into two regions. A line E3 which intersects a side line constituting the polygon is not a division line.

A line E2 does not intersect a side line constituting the polygon and exists within the polygon. Therefore, the line E2 is a division line. By applying the division line E2, the polygon can be divided into two polygons, each of which includes some of the vertexes of the original polygon.

Figure 9A:
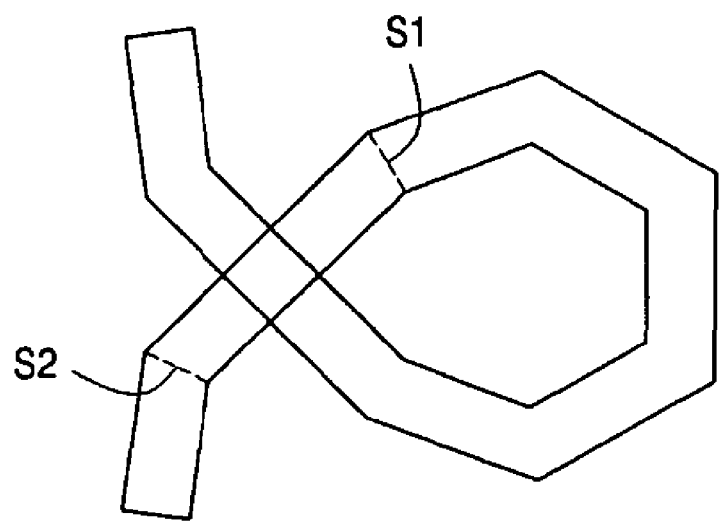
FIGS. 9A to 9C are views for explaining a division line which can reduce the number of intersections and a division line which cannot reduce the number of intersections.
Figure 9B:
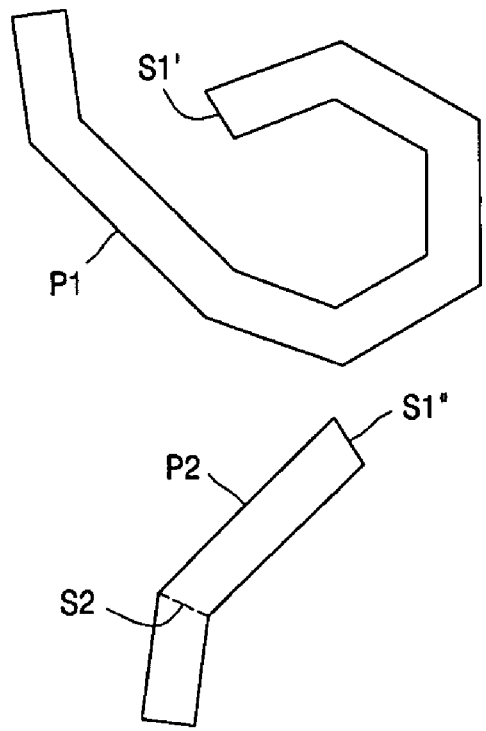
Figure 9C:
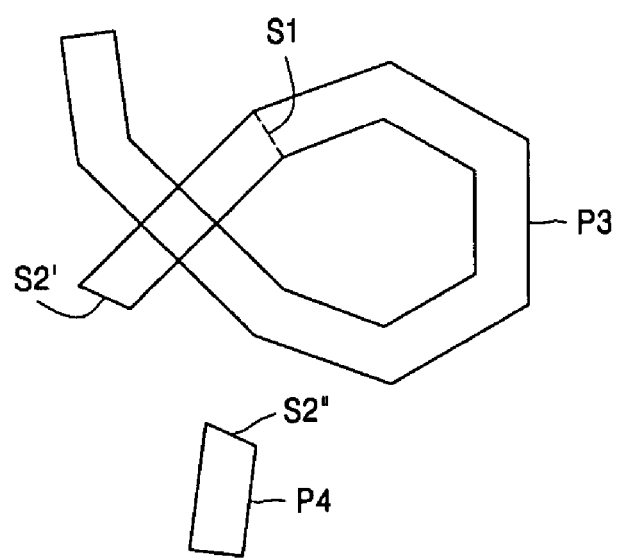

After the division line list 20 is generated, a division line is selected among the division lines so that the number of intersections can be reduced. FIGS. 9A to 9C are views for explaining a division line which can reduce the number of intersections and a division line which cannot reduce the number of intersections. Referring to FIG. 9A, an original polygon has 4 intersections, and there are two division lines S1 and S2. Now, two cases where the two division lines S1 and S2 are selected and applied to the polygon are compared as follows.

FIG. 9B shows a case where the division line S1 is selected and applied to the polygon. By applying the division line S1, the original polygon is divided into two polygons P1 and P2. As shown in the figure, both polygons P1 and P2 have no intersection. As a result, the number of intersections is reduced from 4 to 0 by applying the division line S1. Therefore, the division line selection unit 120 selects the division line S1.

FIG. 9C shows a case where the division line S2 is selected applied to the polygon. By applying the division line S2, the original polygon is divided into two polygons P3 and P4. As shown in the figure, the polygon P3 still has 4 intersections. As a result, the number of intersections is not reduced by applying the division line S2. Therefore, the division line selection unit 120 does not select the division line S2.

Figure 10A:
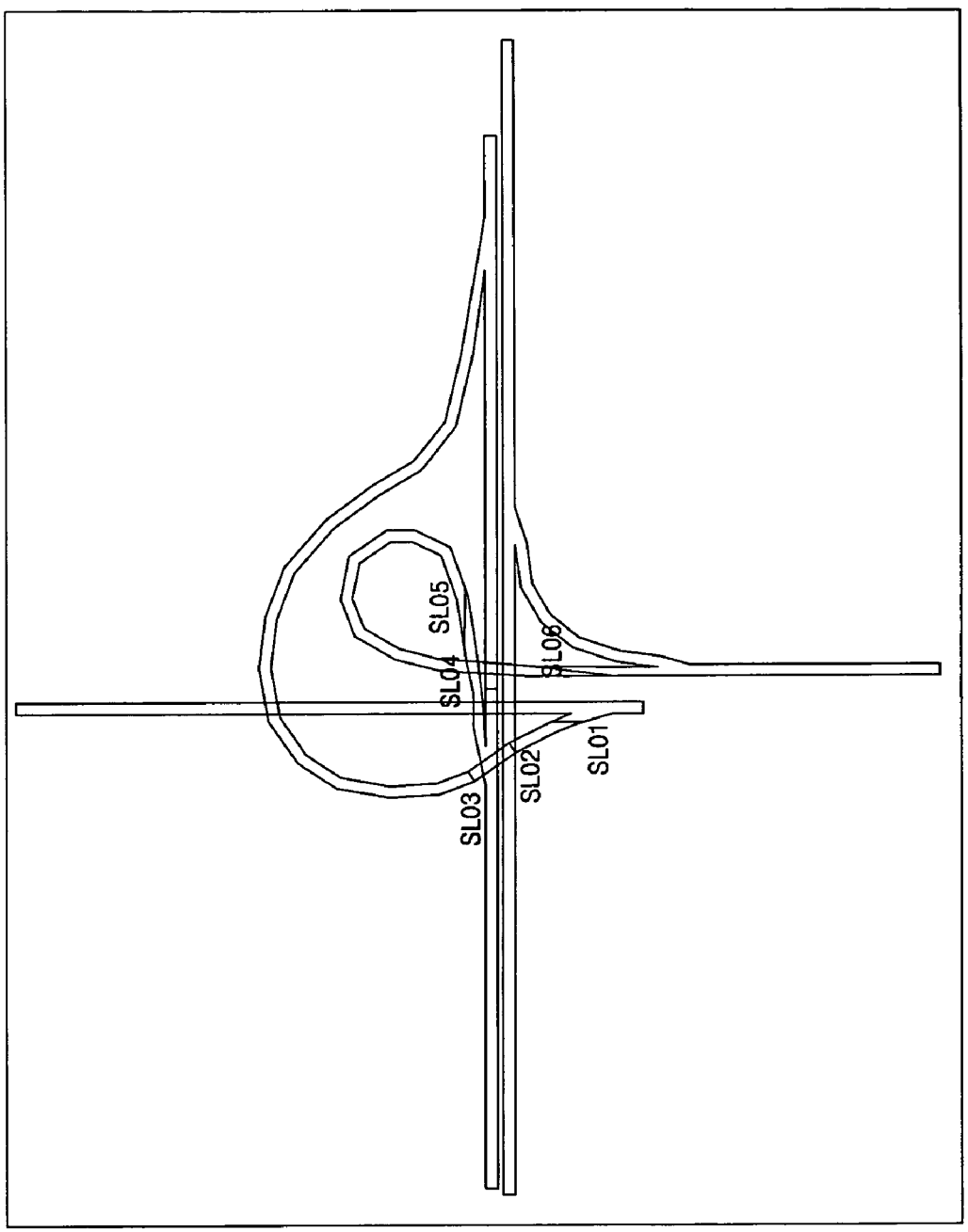
FIGS. 10A and 10B show non-separated and separated flyover data, respectively.
Figure 10B:
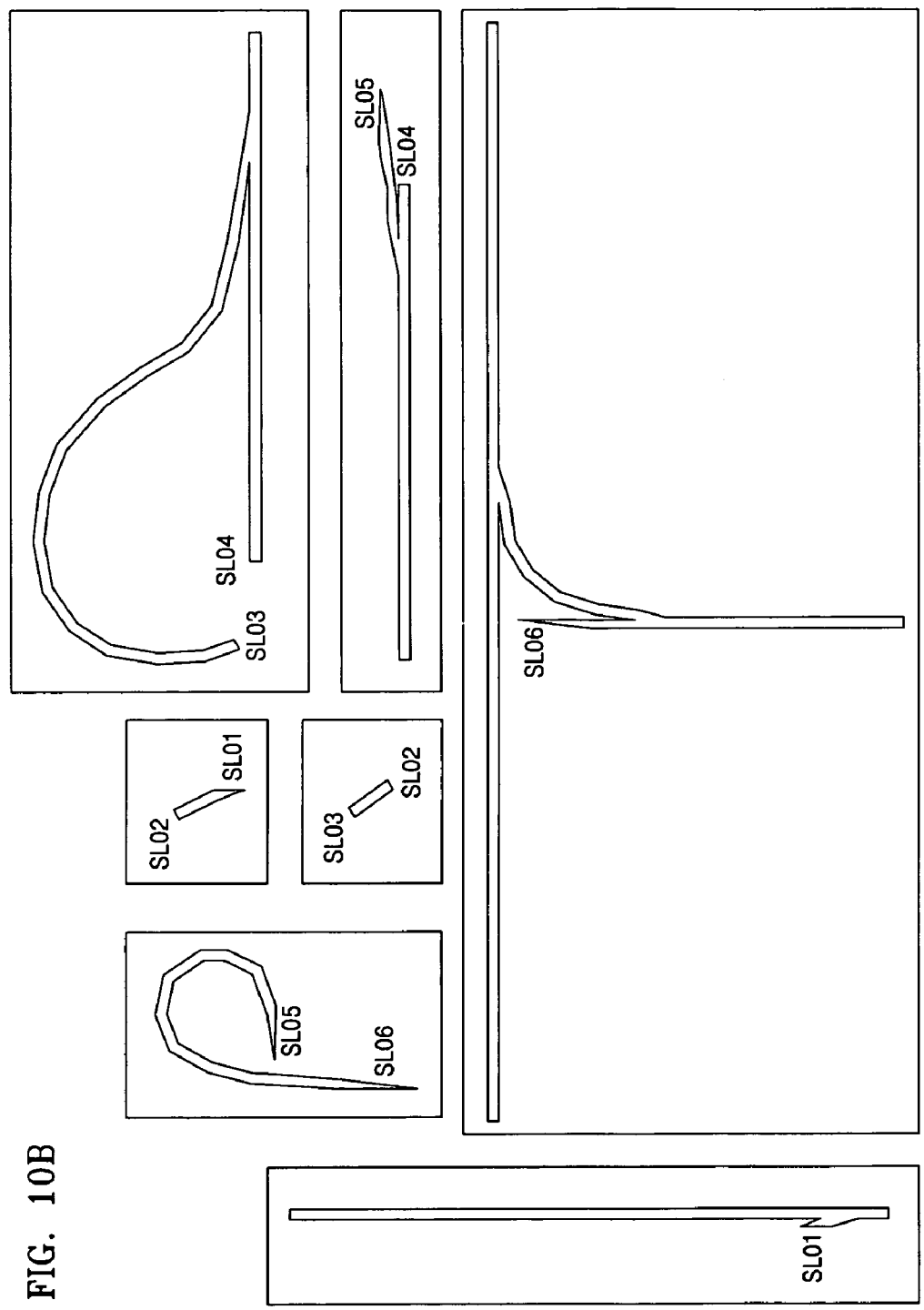

FIG. 10A is a view showing an example of a flyover data. As described above, all the overlapped regions can be separated from the polygon by selecting and applying the division lines SL01, SL02, SL03, SL04, SL05, and SL06. FIG. 10B shows the divided polygons generated by separating the overlapped regions from the flyover data (the original polygon). As shown in FIG. 10B, by applying the division lines SL01 and SL02, the original polygon shown in FIG. 10A is divided into the polygons having no overlapped regions.

Figure 11:
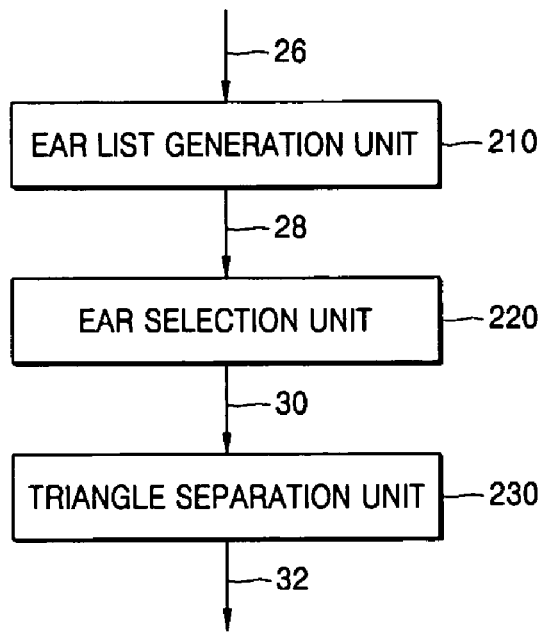
FIG. 11 is a block diagram showing a construction of an exemplary embodiment of a triangulation unit according to the present invention.

FIG. 11 is a block diagram showing a construction of an exemplary embodiment of the triangulation unit 200 shown in FIG. 2. The triangulation unit 200 according to an exemplary embodiment of the present invention includes an ear list generation unit 210, an ear selection unit 220, and a triangle separation unit 230.

Figure 12:
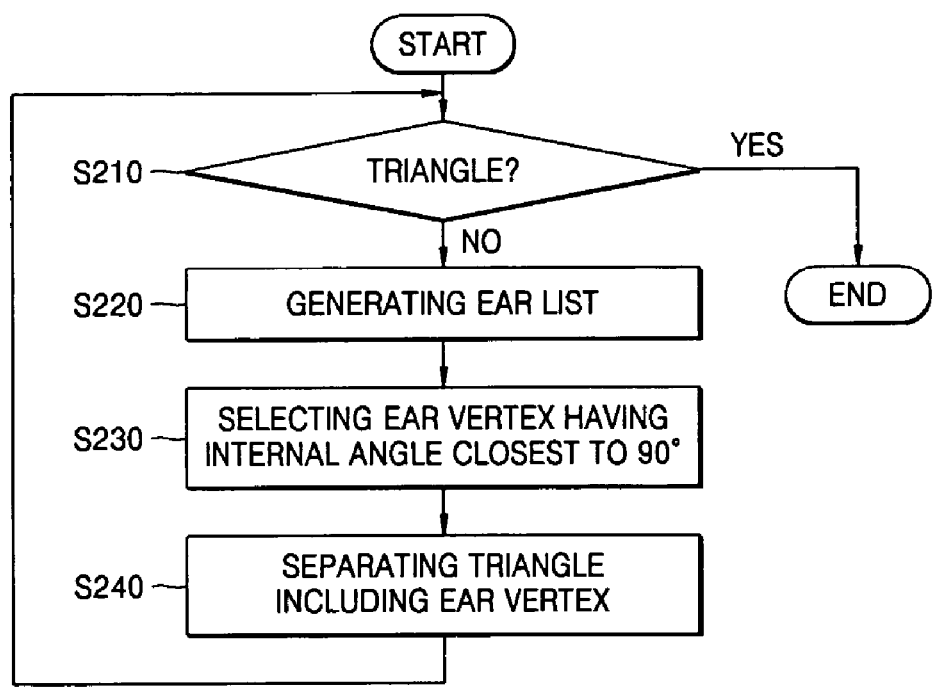
FIG. 12 is a flowchart of an exemplary embodiment of a triangulation operation according to the present invention.

FIG. 12 is a flowchart of an exemplary embodiment of a triangulation operation performed by the triangulation unit 200.

The ear list generation unit 210 generates an ear list 28 by finding an ear vertex among vertexes of separated regions 26 of the polygon (S220). The ear vertex denotes a vertex of a polygon, which satisfies two conditions. A first condition is that the line connecting the two adjacent vertexes of a vertex do not intersect side lines constituting the separated region 26 of the polygon. A second condition is that the line exists within the separated region 26 of the polygon. In order to generate the ear list 28, the ear list generation unit 210 selects one vertex of the separated region 26 of the polygon and adjacent vertexes thereof. Next, the ear list generation unit 210 determines whether or not the line between the adjacent vertexes intersect the side lines constituting the separated region 26 of the polygon. If the two conditions are satisfied, the selected vertex is added to the ear list 28.

The ear selection unit 220 selects a vertex 30 having an internal angle closest to 90° among the vertexes included in the ear list 28 (S230). As a result, in the following triangulation operation, a triangle close to a right triangle can be obtained by using the selected vertex 30. By the triangulation operation, two side lines including the selected vertex and another line between the adjacent vertexes of the selected vertex can be connected at a near right angle, so that more natural roads or flyovers can be constructed.

The triangle separation unit 230 separates a triangle formed with the selected vertex 30 and adjacent side lines thereof from the separated region 26 of the polygon (S240).

The triangulation unit 200 determines whether or not the remaining region is a triangle (S210). If the remaining region is a triangle, the triangulation operation ends. If not, the operations S220 to S240 repeat until the remaining region is triangle.

Figure 13A:
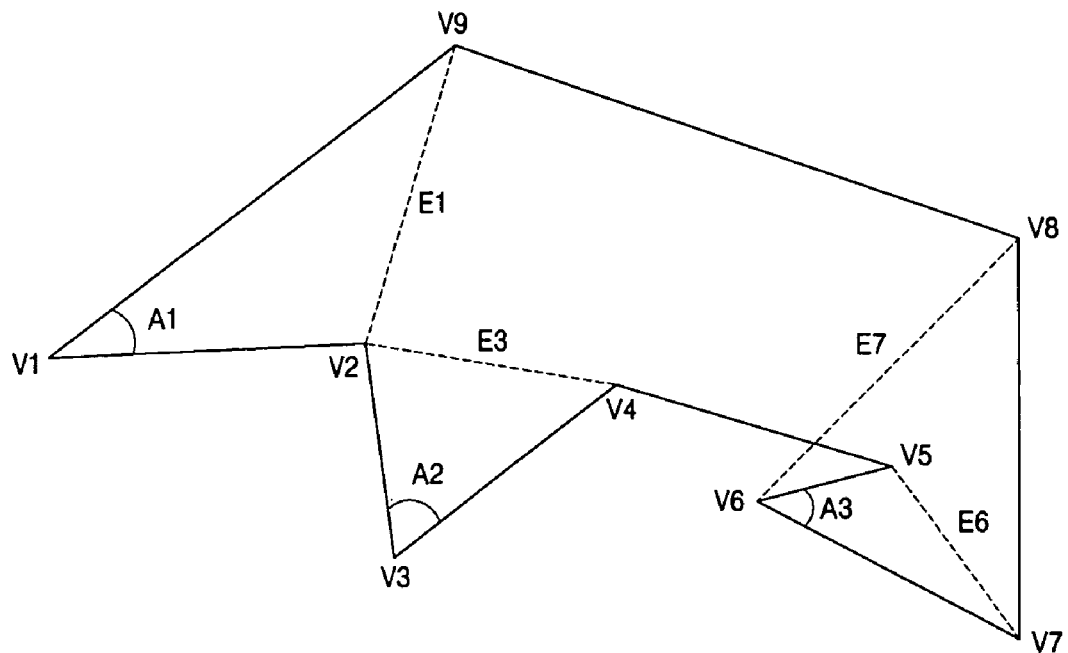
FIGS. 13A to 13C are views showing an example of an operation of triangulating a polygon according to an exemplary embodiment of the present invention.
Figure 13B:
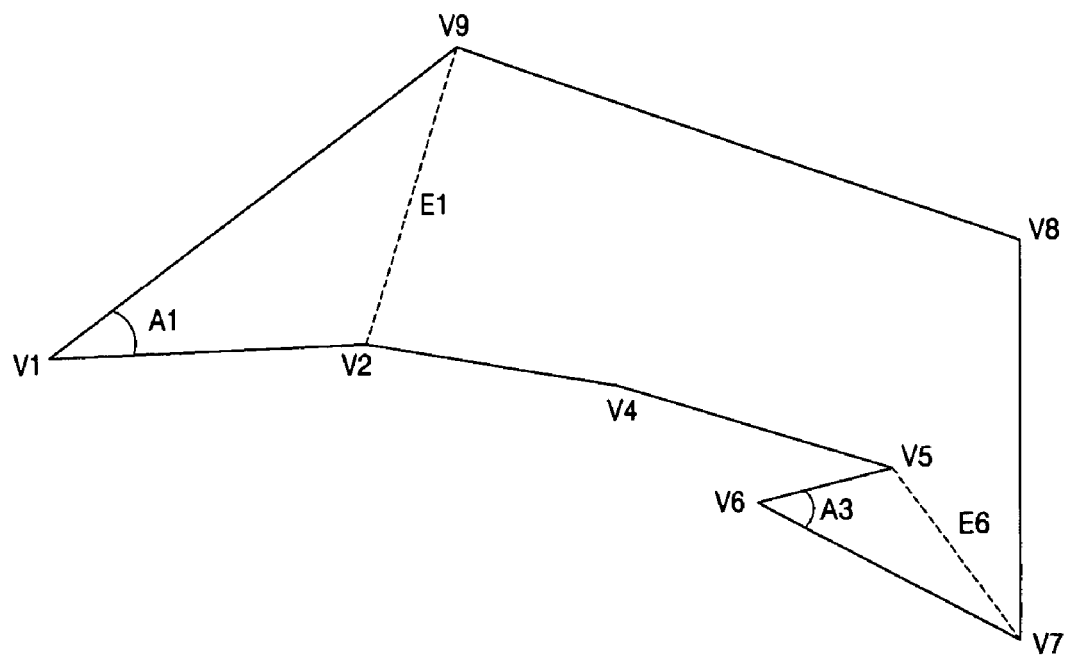
Figure 13C:
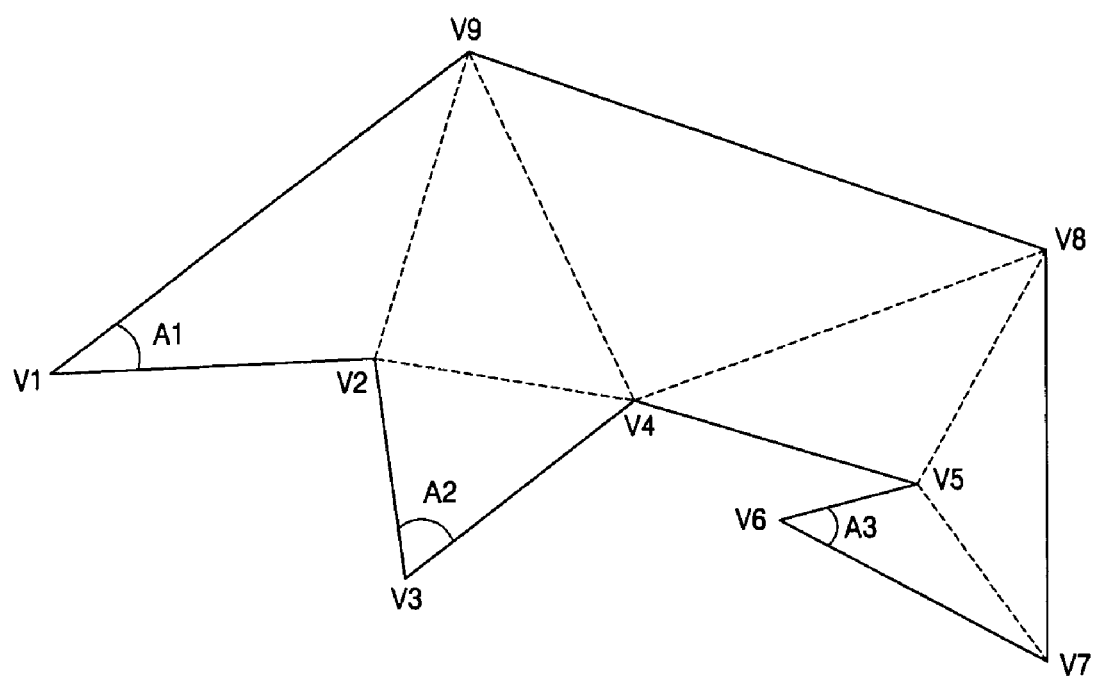

FIGS. 13A to 13C are views showing an example of an operation of triangulating a polygon. FIG. 13A shows ear vertexes of an arbitrary polygon. Referring to FIG. 13A, there are three ear vertexes V1, V3, V6 among the vertexes V1 to V9.

The vertex V1 has both adjacent vertexes V2 and V9. A line E1 connecting the both adjacent vertexes V2 and V9 does not intersect the side lines of the given polygon. The line E1 exists within the polygon. Therefore, the vertex V1 is an ear vertex.

The vertex V2 has both adjacent vertexes V1 and V3. A line connecting the adjacent vertexes V1 and V3 exists outside the polygon. Therefore, the vertex V2 is not an ear vertex.

The vertex V3 has both adjacent vertexes V2 and V4. A line E3 connecting the adjacent vertexes V2 and V4 does not intersect the side lines of the polygon. The line E3 exists within the polygon. Therefore, the vertex V3 is an ear vertex.

The vertex V7 has both adjacent vertexes V6 and V8. A line E7 connecting the adjacent vertexes V6 and V8 intersects a side line of the polygon. Therefore, the vertex V7 is not an ear vertex.

As a result of the determination, the ear vertexes V1, V3, and V6 are added to the ear list 28.

The ear selection unit 220 selects an ear vertex having an internal angle closest to 90° among the ear vertexes. As shown in FIG. 13A, the ear vertex having an internal angle closest to 90° is the ear vertex V3. FIG. 13B shows the remaining region after the triangle formed with the ear vertex V3 and the adjacent side lines are separated.

Since the remaining region is not a triangle, the triangulation operation repeats. As a result of the repeating triangulation operation, the original polygon is divided into a plurality of triangles as shown in FIG. 13C.

As described above, the overlapped region separation unit 100, the triangulation unit 200, and the height coordinate addition unit 300 constitute the two-dimensional-flyover-data three-dimensional visualization apparatus according to an exemplary embodiment of the present invention. The two-dimensional-flyover-data three-dimensional visualization apparatus utilizes these components.

The visualization unit 400 visualizes the three-dimensional flyover data 16 obtained by using the overlapped region separation unit 100, the triangulation unit 200, and the height coordinate addition unit 300. The visualization unit 400 visualizes different portions of the three-dimensional flyover data 16 in different method.

Firstly, the visualization unit 400 visualizes a shadow portion of the flyover. The shadow portion is visualized on the ground by setting the height of the shadow portion as 0. In addition, a transparency operation is performed to provide a transparency effect. The transparency operation is performed by setting a transparency function in a rendering device.

In the shadow-portion visualization, in order to prevent a z-fighting phenomenon at the ground, a z-test function in the rendering device must be set to stop (z-test off). Next, the ground is subject to a rendering process, and then, the flyover is subject to the rendering process. After the rendering process on the shadow portion ends, the z-test function restarts (z-test on).

After the rendering process on the shadow portion ends, upper surfaces, lower surfaces, and guardrails are subject to the rendering process. Firstly, a back-face culling function is set to the rendering device. The upper surfaces of the flyover are subject to a texture mapping process and a single-surface rendering process. The lower surfaces of the flyover are subject to a colored polygon process, in which colors are applied to triangles, and the singe-surface rendering process. The guardrails are subject to the colored polygon process and a both-surface rendering process.

Figure 14A:
FIGS. 14A to 14C are views for explaining a texture mapping process performed on an upper surface of a flyover according to an exemplary embodiment of the present invention.
Figure 14B:
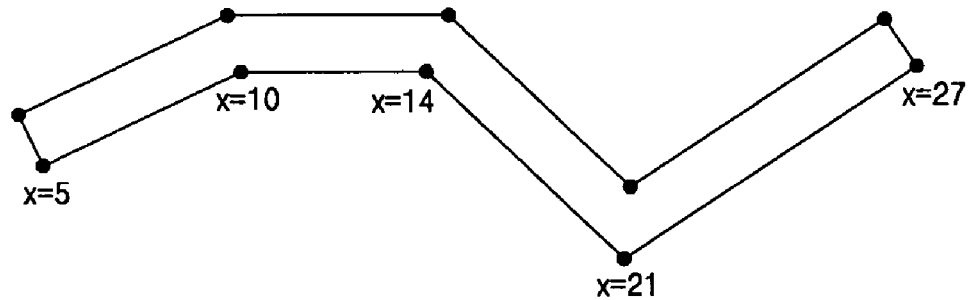
Figure 14C:
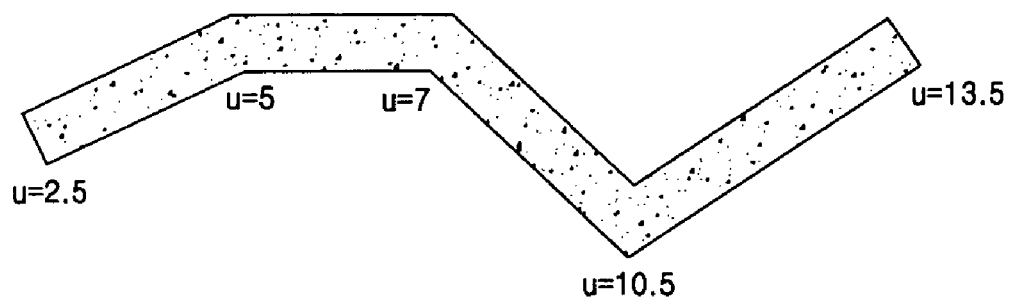

FIGS. 14A to 14C are views for explaining the texture mapping process performed on the upper surface of the flyover. FIG. 14A shows a basic texture. Before the texture shown in FIG. 14A is mapped into a polygon of a flyover shown in FIG. 14B, texture coordinates are calculated. The texture coordinates can be obtained by dividing actual coordinates by a length constant. FIG. 14C shows a texture-mapped upper surface of the flyover obtained in a case where the length constant is 2. In the figure, the u coordinates are obtained by dividing the actual x coordinates by 2.

Figure 15:
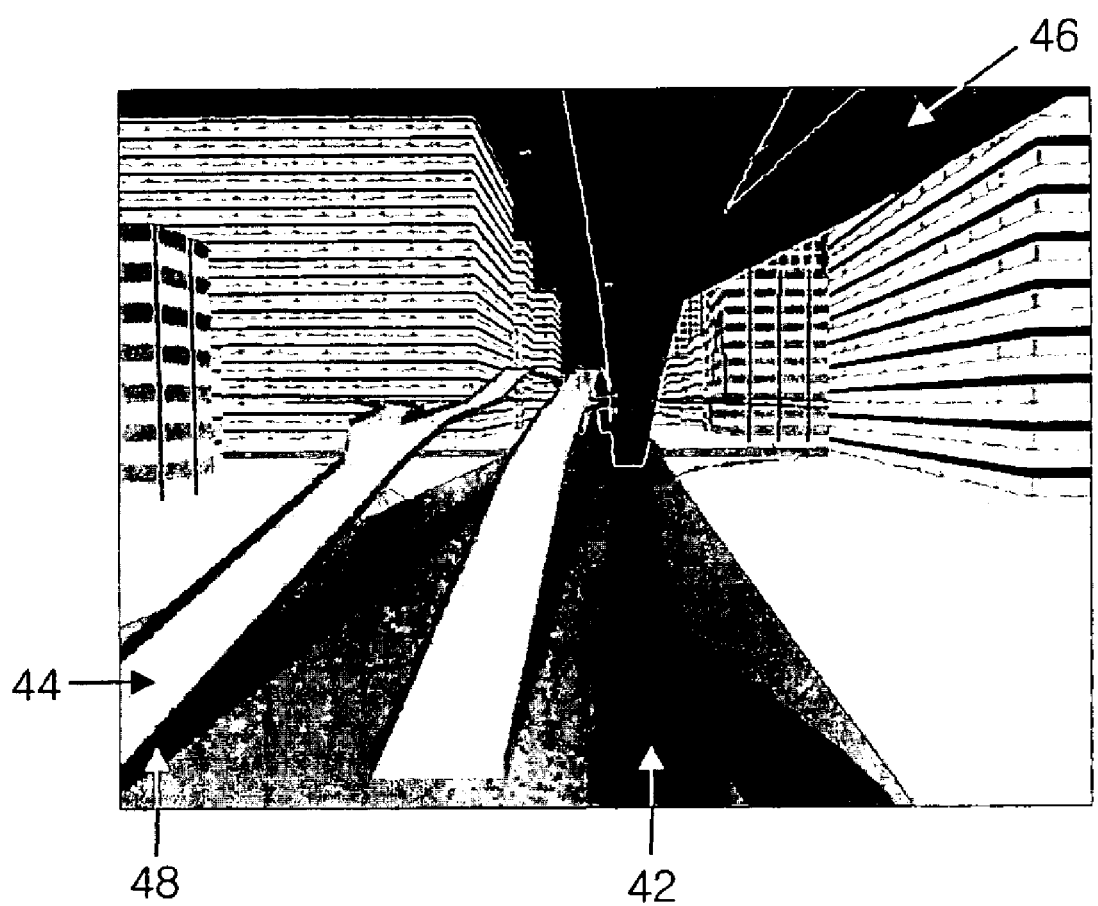
FIG. 15 shows an image of flyovers obtained by a visualization method according to an exemplary embodiment of the present invention.

FIG. 15 shows an image of the flyovers obtained by the aforementioned visualization method. As shown in the image, the upper surfaces 44 of the flyovers are subjected to the texture mapping process, and the lower surfaces 46 are subject to the colored mapping process and the single-surface rendering process. In addition, the shadow portions 42 of the flyovers are visualized on the ground, and the guardrails 48 of the flyovers are subject to the colored mapping process and the both-surface rendering process.

According to exemplary embodiments of a method and apparatus for three-dimensionally transforming two-dimensional flyover data in a three-dimensional graphics environment and exemplary embodiments of a method and apparatus for three-dimensionally visualizing two-dimensional flyover data in a three-dimensional graphics environment, division lines are selectively applied to a polygon to separate overlapped regions from the polygon, an ear cutting algorithm is applied to triangulate the polygon, and various different visualization processes are performed on different portions of the flyover data, so that the two-dimensional flyover data can be effectively transformed into the three-dimensional flyover data and various appearance of the flyover can be visualized. Accordingly, a shape and position of the flyover can be intuitively perceived by users, so that convenience and safety can be provided to the users.

In addition to the above described exemplary embodiments, exemplary embodiments of the present invention can also be implemented by executing computer readable code/instructions in/on a medium, e.g., a computer readable medium. The medium can correspond to any medium/media permitting the storing of the computer readable code.

The computer readable code/instructions can be recorded/transferred on a medium in a variety of ways, with examples of the medium including magnetic storage media (e.g., ROM, floppy disks, hard disks, etc.) and optical recording media (e.g., CD-ROMs, or DVDs. The medium may also be a distributed network, so that the computer readable code/instructions are stored and executed in a distributed fashion. The computer readable code/instructions may be executed by one or more processors.

Although a few embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of three-dimensionally transforming two-dimensional flyover data in a three-dimensional graphics environment, comprising:
   (a) generating a division line list including one or more division lines for dividing a polygon constituting the two-dimensional flyover data into two regions;
   (b) selecting a division line for reducing a number of overlapped regions of the polygon among the division lines included in the division line list; and
   (c) separating the polygon into regions by applying the selected division line to the polygon, wherein the separated regions overlap each other at an overlapped region within the polygon,
   wherein each division line directly connects two vertexes among vertexes forming the polygon, each division line does not intersect a sideline of the polygon, and each division line exists within the polygon, and
   wherein the method is performed using at least one processor.

2. The method according to claim 1, wherein the operation (a) comprises:
   (a1) selecting two vertexes among vertexes of the polygon; and
   (a2) adding a line connecting the two vertexes to the division line list if the line does not intersect sides of the polygon and if the line exists within the polygon.

3. The method according to claim 1, further comprising (d) dividing each of the separated regions of the polygon into one or more triangles.

4. The method according to claim 3, wherein the operation (d) comprises:
   (d1) searching ear vertexes among the vertexes of each of the separated regions of the polygon to generate an ear list;
   (d2) selecting an ear vertex having an internal angle closest to 90° among the ear vertexes included in the ear list; and
   (d3) separating a triangle formed with the selected ear vertex and both adjacent side lines from the separated region of the polygon.

5. The method according to claim 4, wherein the operation (d1) comprises:
   selecting a vertex among the vertexes of the separated region of the polygon;
   selecting both vertexes adjacent to the selected vertex in the separated region of the polygon; and
   adding the selected vertex to the ear list if a line connecting the both adjacent vertexes does not intersect side lines of the separated region of the polygon and if the line exist within the separated region of the polygon.

6. An apparatus for three-dimensionally transforming two-dimensional flyover data in a three-dimensional graphics environment, comprising:
   a division line list generation unit to generate a division line list including one or more division lines of dividing a polygon constituting the two-dimensional flyover data into two regions;
   a division line selection unit to select a division line for reducing the number of overlapped regions of the polygon among the division lines included in the division line list; and
   a division line applying unit to separate the polygon into regions by applying the selected division line to the polygon, wherein the separated regions overlap each other at an overlapped region within the polygon,
   wherein each division line directly connects two vertexes among vertexes forming the polygon, each division line does not intersect a sideline of the polygon, and each division line exists within the polygon.

7. The apparatus according to claim 6, wherein the division line list generation unit comprises:
   a vertex selection unit to select two vertexes among vertexes of the polygon; and
   a division line addition unit to add a line connecting the two vertexes to the division line list if the line does not intersect side lines of the polygon and if the line exists within the polygon.

8. The apparatus according to claim 6, further comprising a triangulation unit to divide each of the separated regions of the polygon into one or more triangles.

9. The apparatus according to claim 8, wherein the triangulation unit comprises:
   an ear list generation unit to search ear vertexes among the vertexes of each of the separated regions of the polygon to generate an ear list;
   an ear selection unit to select an ear vertex having an internal angle closest to 90° among the ear vertexes included in the ear list; and
   a triangle separation unit to separate a triangle formed with the selected ear vertex and both adjacent side lines from the separated region of the polygon.

10. The apparatus according to claim 9, wherein the ear list generation unit comprises:
    a candidate vertex selection unit to select a vertex among the vertexes of the separated region of the polygon;
    an adjacent vertex selection unit to select both vertexes adjacent to the selected vertex in the separated region of the polygon; and
    an ear addition unit to add the selected vertex to the ear list if a line connecting the both adjacent vertexes does not intersect side lines of the separated region of the polygon and if the line exist within the separated region of the polygon.

11. A method of three-dimensionally visualizing two-dimensional flyover data in a three-dimensional graphics environment, comprising:
    (a) separating a polygon constituting the two-dimensional flyover data into regions using one or more division lines, which are selected to reduce a number of overlapped regions of the polygon, wherein the separated regions overlap each other at an overlapped region within the polygon;
    (b) dividing each of the separated regions of the polygon into one or more triangles;

(c) generating three-dimensional flyover data by adding height coordinates to the respective vertexes of the divided triangles; and (d) visualizing the three-dimensional flyover data, wherein each division line directly connects two vertexes among vertexes forming the polygon, each division line does not intersect a sideline of the polygon, and each division line exists within the polygon, and wherein the method is performed using at least one processor.

12. The method according to claim 11, wherein the operation (a) comprises:

(a1) generating a division line list including one or more division lines of dividing the polygon constituting the two-dimensional flyover data into two regions;

(a2) selecting a division line for reducing the number of overlapped regions of the polygon among the division lines included in the division line list; and (a3) separating the divided regions from the polygon by applying the selected division line to the polygon.

13. The method according to claim 12, wherein the operation (a1) comprises:

selecting two vertexes among vertexes of the polygon; and adding a line connecting the two vertexes to the division line list if the line does not intersect side lines of the polygon and if the line exists within the polygon.

14. The method according to claim 11, wherein the operation (b) comprises:

(b1) searching ear vertexes among the vertexes of each of the separated regions of the polygon to generate an ear list;

(b2) selecting an ear vertex having an internal angle closest to 90° among the ear vertexes included in the ear list; and (b3) separating a triangle formed with the selected ear vertex and both adjacent side lines from the separated region of the polygon.

15. The method according to claim 14, wherein the operation (b1) comprises:

selecting a vertex among the vertexes of the separated region of the polygon;

selecting both vertexes adjacent to the selected vertex in the separated region of the polygon; and adding the selected vertex to the ear list if a line connecting the both adjacent vertexes does not intersect side lines of the separated region of the polygon and if the line exist within the separated region of the polygon.

16. The method according to claim 11, wherein the operation (d) comprises:

(d1) rendering a shadow portion of the flyover; and (d2) rendering an upper surface, a lower surface, and a guardrail of the flyover.

17. The method according to claim 16, wherein the operation (d1) comprises:

setting a transparency function and stopping a z-test function in a rendering device before the rendering of the shadow portion of the flyover starts, and restarting the z-test function after the rendering of the shadow portion of the flyover ends.

18. The method according to claim 16, wherein the operation (d2) comprises:

setting a back-face function in a rendering device.

19. The method according to claim 16, wherein the operation (d2) comprises:

applying textures to the upper surface of the flyover to render the upper surface of the flyover.

20. An apparatus for three-dimensionally visualizing two-dimensional flyover data in a three-dimensional graphics environment, comprising:

an overlapped region separation unit to separate a polygon constituting the two-dimensional flyover data into regions using one or more division lines, which are selected to reduce a number of overlapped regions of the polygon, wherein the separated regions overlap each other at an overlapped region within the polygon;

a triangulation unit to divide each of the separated regions of the polygon into, one or more triangles;

a height coordinate addition unit to generate three-dimensional flyover data by adding height coordinates to the respective vertexes of the divided triangles; and a visualization unit to visualize the three-dimensional flyover data, wherein each division line directly connects two vertexes among vertexes forming the polygon, each division line does not intersect a sideline of the polygon, and each division line exists within the polygon.

21. The apparatus according to claim 20, wherein the overlapped region separation unit comprises:

a division line list generation unit to generate a division line list including one or more division lines of dividing a polygon constituting the two-dimensional flyover data into two regions;

a division line selection unit to select a division line for reducing the number of overlapped regions of the polygon among the division lines included in the division line list; and a division line applying unit to separate the divided regions from the polygon by applying the selected division line to the polygon.

22. The apparatus according to claim 21, wherein the division line list generation unit comprises:

a vertex selection unit to select two vertexes among vertexes of the polygon; and a division line addition unit to add a line connecting the two vertexes to the division line list if the line does not intersect side lines of the polygon and if the line exists within the polygon.

23. The apparatus according to claim 20, wherein the triangulation unit comprises:

an ear list generation unit to search ear vertexes among the vertexes of each of the separated regions of the polygon to generate an ear list;

an ear selection unit to select an ear vertex having an internal angle closest to 90° among the ear vertexes included in the ear list; and a triangle separation unit to separate a triangle formed with the selected ear vertex and both adjacent side lines from the separated region of the polygon.

24. The apparatus according to claim 23, wherein the ear list generation unit comprises:

a candidate vertex selection unit to select a vertex among the vertexes of the separated region of the polygon;

an adjacent vertex selection unit to select both vertexes adjacent to the selected vertex in the separated region of the polygon; and an ear addition unit to add the selected vertex to the ear list if a line connecting the both adjacent vertexes does not intersect side lines of the separated region of the polygon and if the line exist within the separated region of the polygon.

25. The apparatus according to claim 20, wherein the visualization unit comprises:

a shadow portion visualization unit to render a shadow portion of the flyover; and a flyover body visualization unit to render an upper surface, a lower surface, and a guardrail of the flyover.

26. The apparatus according to claim 25, wherein the shadow portion visualization unit comprises:

a transparency setting unit to set a transparency function in a rendering device before the rendering of the shadow portion of the flyover starts, and a z-test function setting unit to stop a z-test function in the rendering device before the rendering of the shadow portion of the flyover starts and restarting the z-test function after the rendering of the shadow portion of the flyover ends.

27. The apparatus according to claim 25, wherein the flyover body visualization unit sets a back-face function in a rendering device.

28. The apparatus according to claim 25, wherein the flyover body visualization unit applies textures to the upper surface of the flyover to render the upper surface of the flyover.

29. At least one computer-readable medium storing instructions that control at least one processor to perform a method of three-dimensionally transforming two-dimensional flyover data in a three-dimensional graphics environment, wherein the method comprises:

generating a division line list including one or more division lines of dividing a polygon constituting the two-dimensional flyover data into two regions;

selecting a division line for reducing the number of overlapped regions of the polygon among division lines included in the division line list; and separating the polygon into regions by applying the selected division line to the polygon, wherein the separated regions overlap each other at an overlapped region within the polygon, wherein each division line directly connects two vertexes among vertexes forming the polygon, each division line does not intersect a sideline of the polygon, and each division line exists within the polygon.

30. At least one computer-readable medium storing instructions that control at least one processor to perform a method of three-dimensionally visualizing two-dimensional flyover data in a three-dimensional graphics environment, wherein the method comprises:

separating a polygon constituting the two-dimensional flyover data into regions using one or more division lines, which are selected to reduce a number of overlapped regions of the polygon, wherein the separated regions overlap each other at an overlapped region within the polygon;

dividing each of the separated regions of the polygon into one or more triangles;

generating three-dimensional flyover data by adding height coordinates to the respective vertexes of the divided triangles; and visualizing the three-dimensional flyover data, wherein each division line directly connects two vertexes among vertexes forming the polygon, each division line does not intersect a sideline of the polygon, and each division line exists within the polygon.

31. A method of three-dimensionally transforming two-dimensional flyover data in a three-dimensional graphics environment, comprising:

selecting a division line for reducing a number of overlapped regions of a polygon among a plurality of division lines, which divide a polygon comprising the two dimensional flyover data into regions; and separating the polygon into regions by applying the selected division line to the polygon, wherein the separated regions overlap each other at an overlapped region within the polygon, wherein the selected division line directly connects two vertexes among vertexes forming the polygon, the selected division line does not intersect a sideline of the polygon, and the selected division line exists within the polygon, and wherein the method is performed using at least one processor.

32. At least one computer-readable medium storing instructions that control at least one processor to perform a method of three-dimensionally transforming two-dimensional flyover data in a three-dimensional graphics environment, wherein the method comprises:

selecting a division line for reducing a number of overlapped regions of a polygon among a plurality of division lines, which divide a polygon comprising the two dimensional flyover data into regions; and separating the polygon into regions by applying the selected division line to the polygon, wherein the separated regions overlap each other at an overlapped region within the polygon, wherein each division line directly connects two vertexes among vertexes forming the polygon, each division line does not intersect a sideline of the polygon, and each division line exists within the polygon.

* * * * *

UNITED STATES PATENT AND TRADEMARK OFFICE
CERTIFICATE OF CORRECTION

| | | |
|---|---|---|
| PATENT NO. | : 7,982,735 B2 | Page 1 of 1 |
| APPLICATION NO. | : 11/226201 | |
| DATED | : July 19, 2011 | |
| INVENTOR(S) | : Keechang Lee et al. | |

It is certified that error appears in the above-identified patent and that said Letters Patent is hereby corrected as shown below:

Column 12, Line 11, In Claim 20, delete "into," and insert -- into --, therefor.

Signed and Sealed this
Fourteenth Day of February, 2012

David J. Kappos
*Director of the United States Patent and Trademark Office*